United States Patent
Nantz et al.

(10) Patent No.: US 7,358,852 B2
(45) Date of Patent: Apr. 15, 2008

(54) TIRE PRESSURE MONITORING SENSOR DIAGNOSIS VIA VEHICLE ANTITHEFT AND ENTRY SYSTEM

(75) Inventors: John S. Nantz, Brighton, MI (US); Qingfeng Tang, Novi, MI (US); Riad Ghabra, Dearborn Heights, MI (US); Thomas J. LeMense, Farmington, MI (US)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 11/164,430

(22) Filed: Nov. 22, 2005

(65) Prior Publication Data

US 2006/0208864 A1  Sep. 21, 2006

Related U.S. Application Data

(63) Continuation-in-part of application No. 10/697,742, filed on Oct. 30, 2003, now abandoned.

(51) Int. Cl.
*G60C 23/00* (2006.01)
(52) U.S. Cl. .............. 340/447; 340/442; 76/146; 116/34 R
(58) Field of Classification Search ........... 340/447, 340/442, 426.13, 426.14, 426.15, 502, 504, 340/505, 514, 426.12, 426.17; 73/146.2, 73/146.4, 146.5
See application file for complete search history.

(56) References Cited

U.S. PATENT DOCUMENTS

| 5,463,374 | A |  | 10/1995 | Mendez |
| 5,600,301 | A |  | 2/1997 | Robinson, III |
| 5,612,671 | A | * | 3/1997 | Mendez et al. ............ 340/447 |
| 5,670,933 | A |  | 9/1997 | Hayashi |
| 5,741,966 | A |  | 4/1998 | Handfield et al. |
| 6,420,967 | B1 |  | 7/2002 | Ghabra et al. |
| 6,438,467 | B1 |  | 8/2002 | Pacsai |
| 6,630,885 | B2 | * | 10/2003 | Hardman et al. ........... 340/505 |
| 6,745,624 | B2 | * | 6/2004 | Porter et al. ............... 73/146.2 |
| 2002/0149477 | A1 |  | 10/2002 | Desai et al. |
| 2003/0129949 | A1 | * | 7/2003 | Selektor ...................... 455/88 |
| 2003/0145645 | A1 |  | 8/2003 | Porter et al. |

FOREIGN PATENT DOCUMENTS

| DE | 4309265 A1 | 10/1993 |
| DE | 10226995 A1 | 5/2004 |
| EP | 1211104 A1 | 6/2002 |

* cited by examiner

*Primary Examiner*—Benjamin C. Lee
*Assistant Examiner*—Travis R. Hunnings
(74) *Attorney, Agent, or Firm*—Brooks Kushman P.C.

(57) ABSTRACT

A vehicle tire pressure monitoring (TPM) system, the system including an immobilizer transmitter that transmits at least one low frequency (LF) sensor diagnostic signal, at least one TPM sensor, wherein the at least one TPM sensor includes a transceiver that receives the at least one LF sensor diagnostic signal and, when the at least one TPM sensor is operating properly, presents at least one radio frequency (RF) message signal, and a TPM receiver that receives the at least one RF message signal and provides an indication to an operator when the at least one RF message signal is received, wherein the LF sensor diagnostic signal is transmitted to determine proper operation of the at least one TPM sensor.

20 Claims, 1 Drawing Sheet

TIRE PRESSURE MONITORING SENSOR DIAGNOSIS VIA VEHICLE ANTITHEFT AND ENTRY SYSTEM

CROSS REFERENCE TO RELATED PATENT APPLICATIONS

This patent application is a continuation-in-part of prior patent application Ser. No. 10/697,742 filed on Oct. 30, 2003 now abandoned, which is incorporated by reference in its entirety.

BACKGROUND OF THE INVENTION

1. Field of the Invention

The present invention relates to a system and a method for tire pressure monitoring sensor diagnosis via a vehicle antitheft and entry system.

2. Background Art

Conventional automotive industry remote keyless entry (RKE) approaches have been implemented to communicate with a vehicle through the use of a hand held transmitter. The hand held transmitter is commonly implemented in connection with a key fob. Currently available conventional RKE transmitters may be separate units (i.e., key fobs), or the RKE transmitter assembly may be part of an ignition keyhead, preferably along with a vehicle immobilization transponder. Such RKE key fobs and keyheads generally utilize an antenna to transmit radio frequency (RF) signals to a vehicle in order to lock or unlock vehicle doors, open or close a vehicle sliding door, unlock a vehicle trunk, activate internal and/or external vehicle lights, and/or activate a "panic" alarm. Remote access systems using such RKE fobs and keyheads typically employ on-off keying (OOK) or amplitude shift keying (ASK) modulation schemes for the RF signals.

Conventional approaches for wireless monitoring of vehicle tire parameters, particularly tire pressure have been implemented. An exemplary tire monitoring system is described and shown in U.S. Pat. Nos. 5,600,301 and 5,463,374, which also describes a vehicle remote access device. In such tire monitoring systems, RF transmitters mounted inside each tire, typically adjacent the inflation valve stem, transmit information concerning tire pressure to a receiver located on-board the vehicle. The information delivered by the RF signals from the transmitters is subsequently conveyed to a vehicle operator, typically in the form of a display. Like conventional vehicle remote access systems, such conventional tire monitoring systems also typically employ OOK or ASK modulation schemes for the RF signals. When such modulation schemes are used, however, there can be strong adverse effects on reception of the RF signal, because the amplitude of a signal transmitted from a rotating tire can vary significantly during the period of the transmission.

Conventional vehicle immobilization approaches, in order to deter vehicle theft, are also known in the automotive industry. U.S. Pat. No. 5,670,933 illustrates an example of such an immobilization system. Such vehicle anti-theft devices typically employ low frequency (LF) transponders in a vehicle ignition keyhead. In such systems, upon insertion of the vehicle ignition key into the vehicle ignition keyhole, an interrogation signal is sent (i.e., transmitted, broadcast, presented, etc.) by the vehicle. In response, the keyhead transponder transmits an encrypted code to a control unit, such as a microprocessor, on-board the vehicle. When the code sent by the transponder is valid (i.e., the control unit authenticates the received code), the control unit generates a signal operative to permit the vehicle to be activated. However, when the code is not received by the control unit, or when the code is not valid (i.e., the control unit cannot authenticate the received code), the control unit generates a signal operative to immobilize the vehicle, for example, by cutting off power to the fuel supply for the vehicle engine.

Conventional approaches for shared vehicle remote access, tire monitoring and vehicle immobilization are also known in the automotive industry. U.S. Pat. No. 6,420,967 illustrates an example of such an immobilization system. Such a system and method employs a combined RKE, tire monitoring and vehicle immobilization receiver and a single microprocessor controller. Such a system and method uses an OOK or ASK modulation scheme for RKE, while employing frequency shift keying (FSK) modulation scheme for tire monitoring. Still further, such a system and method provides an RF link for implementation in the vehicle immobilization.

A number of conventional vehicle TPM systems implement an existing RF interface (e.g., an RKE interface) to the TPM receiver. Increasingly, conventional vehicle TPM systems implement LF command signals. A number of conventional TPM sensors implement an LF command interface that is configured to provide sensor testing and diagnosis. The LF command interface is typically implemented such that the TPM sensor manufacturer and service personnel (e.g., vehicle dealership personnel, etc.) using specialized (sometimes vehicle specific) tools can perform the TPM sensor testing and diagnosis during manufacture, retrofit, replacement, etc. operations without the service personnel mounting the TPM sensor in a wheel assembly and mounting the wheel assembly on the respective vehicle prior to the testing and/or diagnosis. The TPM sensor testing and diagnosis can be performed without having to mount the TPM sensor in a wheel and mount the wheel on a vehicle via the specialized equipment that is available to the TPM sensor manufacturer and authorized service personnel such as vehicle dealership personnel.

However, when personnel other than dealership mechanics or manufacturer technicians have a need to determine if a TPM sensor is working properly, the TPM sensor typically must first be installed in the wheel assembly, the wheel assembly is balanced, then the wheel is installed on the vehicle. The vehicle TPM system is then operated in a test mode to determine TPM sensor operation. However, when the TPM sensor is not working properly (e.g., due damage from a flat tire, or the like), a significant amount of time and cost are expended prior to determination of proper TPM sensor operation. When the TPM sensor does not work properly and must be repaired or replaced, the time and cost are wasted.

Thus, there exists a need and an opportunity for a system and a method to quickly perform TPM sensor test and diagnosis before the TPM sensor is fastened to a wheel and the wheel is installed on a vehicle. Such a system and method may implement a new and innovative TPM sensor test and diagnosis, and result in the saving of a significant amount of time and cost when compared to conventional approaches to TPM sensor test and diagnosis.

SUMMARY OF THE INVENTION

The present invention generally provides an improved method and an improved system for tire pressure monitoring (TPM) sensor testing and diagnosis via a vehicle antitheft and/or entry system. Such a system and method may implement a new and innovative TPM sensor test and diagnosis, and result in the saving of a significant amount of time and cost when compared to conventional approaches to TPM sensor test and diagnosis.

According to the present invention, a vehicle tire pressure monitoring (TPM) system is provided. The system comprising an immobilizer transmitter, at least one TPM sensor, and a TPM receiver. The immobilizer transmitter transmits at least one low frequency (LF) sensor diagnostic signal. The at least one TPM sensor comprises a transceiver that receives the at least one LF sensor diagnostic signal and, when the at least one TPM sensor is operating properly, presents at least one radio frequency (RF) message signal. The TPM receiver receives the at least one RF message signal and provides an indication to an operator when the at least one RF message signal is received, wherein the LF sensor diagnostic signal is transmitted to determine proper operation of the at least one TPM sensor and re-configure the operating parameters of the at least one TPM sensor.

Also according to the present invention, for use in a vehicle tire pressure monitoring (TPM) system, a method of determining proper operation of a TPM sensor is provided. The method comprising transmitting at least one low frequency (LF) sensor diagnostic signal via an immobilizer transmitter, providing at least one TPM sensor, wherein of the at least one TPM sensor comprises a transceiver that receives the at least one LF command signal and presents at least one radio frequency (RF) message signal, presenting the RF message signal when the at least one TPM sensor is operating properly, and providing an indication to an operator when the at least one RF message signal is received by a TPM receiver.

Further, according to the present invention, a vehicle tire pressure monitoring (TPM) system having self-diagnostics is provided. The system comprising an immobilizer transmitter, at least one TPM sensor, and a combination remote keyless entry and TPM receiver. The immobilizer transmitter transmits at least one low frequency (LF) sensor diagnostic signal. The at least one TPM sensor comprises a transceiver that receives the at least one LF sensor diagnostic signal, and presents at least one radio frequency (RF) message signal in response to the LF sensor diagnostic signal when operating properly. The combination remote keyless entry and TPM receiver receives the at least one RF message signal and provides an indication to an operator when the at least one RF message signal is received and an alert to the operator when the at least one RF message signal is not received.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides a system and a method for tire pressure monitoring sensor diagnosis. In one example, the improved method and system may be implemented in connection with or via a vehicle anti-theft and entry system.

The present invention may implement vehicle immobilizer, remote keyless entry (RKE), and/or tire pressure monitoring (TPM) receiver systems to incorporate TPM sensor test and diagnosis capability, that is not available in conventional approaches (e.g., via novel and improved control software). The present invention may provide for implementation of a vehicle anti-theft immobilizer system to read, command, and control a TPM sensor when the TPM sensor is placed nearby the vehicle anti-theft immobilizer system, and for response via a vehicle RKE system, such that sensor testing, diagnosis, teaching the TPM sensor to the vehicle or a particular location on the vehicle, and the like may be performed without implementation of specialized equipment as is implemented in conventional approaches.

The present invention may provide a TPM system and method having self-diagnostics. The present invention may provide for implementation of a simple apparatus and technique (i.e., a system and a method) for an owner or independent mechanic to determine when a TPM tire sensor is faulty, to aid in the diagnosis of a faulty TPM sensor and/or TPM system, teach new/alternative sensors to the TPM system, etc. The present invention may be implemented in connection with vehicle immobilizer, TPM, and RKE systems and methodologies. The present invention may result in the saving of a significant amount of time and cost when compared to conventional approaches to TPM sensor test and diagnosis.

Figure 1:
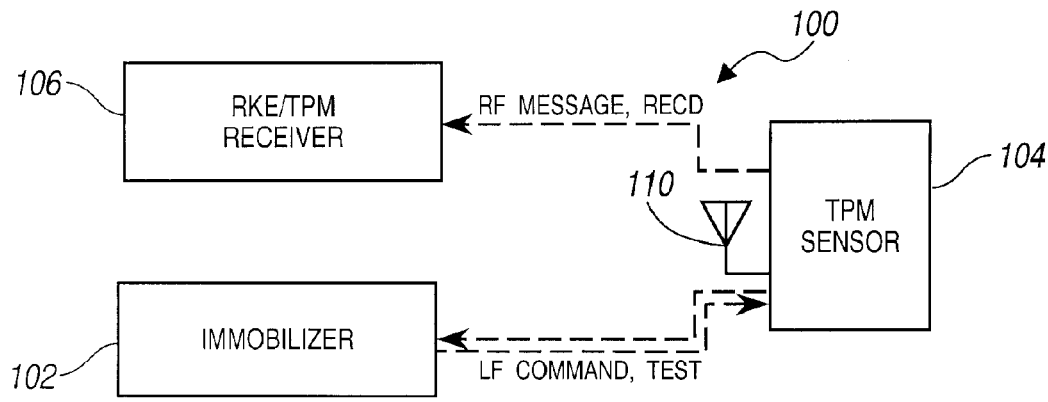
FIG. 1 is a diagram of a tire pressure monitoring system of the present invention.

Referring to FIG. 1, a diagram illustrating a tire pressure monitoring (TPM) system 100 in accordance with the present invention is shown. The TPM system 100 generally comprises an immobilizer circuit (i.e., unit, apparatus, transmitter, transceiver, etc.) 102, at least one TPM sensor 104, and a TPM, remote keyless entry (RKE), or combination TPM/RKE circuit (i.e., receiver, apparatus, unit, transmitter, transceiver, etc.) 106. The system 100 is generally implemented in connection with a vehicle (not shown, e.g., automobile, truck, sport utility vehicle, mini-van, full-sized van, etc.) having a number of wheel assemblies (not shown). The wheel assemblies generally comprise at least one tire mounted on a rim where the tire is inflated with a gas (generally air). The system 100 may be implemented as a TPM system having self-diagnostics.

The TPM system 100 is generally implemented to monitor at least air pressure inside the at least one wheel and provide information to a user (or operator) regarding the tire pressure. For example, the TPM system 100 may provide at least one alert signal (e.g., an audible warning, a visual warning such as a flashing LED, etc.) when an anomalous operating condition such as tire under inflation or an over inflation is detected. Other anomalous operating conditions such as tire over temperature conditions, loss of TPM sensor signal, etc. may also be reported by the system 100. The system 100 may provide the user an indication of a particular wheel that experienced the anomalous operating condition.

The immobilizer 102 may be implemented in connection with a vehicle anti-theft (or theft deterrent) system. In the present invention, the immobilizer 102 may be configured (or controlled) to present at least one LF command (e.g., TEST). The signal TEST is generally implemented as a TPM sensor diagnostic signal. The signal TEST may be implemented as a TPM system diagnostic signal. The signal TEST is generally presented in connection with operations such as a TPM sensor operation test, a TPM sensor diagnosis, a TPM system diagnosis, a TPM sensor teaching (or association) to the TPM system, a TPM sensor location teaching (or association) on the vehicle within the TPM system, and the like, independently of vehicle immobilization operation.

The immobilizer 102 is generally further configured to present (i.e., transmit, broadcast, send, etc.) at least one low frequency (LF) command (i.e., signal) in connection with vehicle theft deterrent. Such a vehicle theft deterrent command may be a signal that is presented to disable a vehicle fuel pump, enable an alarm, disable a vehicle powertrain control module (PCM), etc.

The LF command presented by immobilizer 102 may also write information to TPM sensor 104. In some aspects, the LF command may write/re-write the identification code for TPM sensor 104, reconfigure the operating parameters of TPM sensor 104, and re-flash the memory of TPM sensor 104.

The at least one TPM sensor 104 generally comprise an assembly (i.e., module, apparatus, etc.) having a unique identification code ("ID") or other appropriate identifier and including at least one sensing device (not shown) configured to determine an appropriate physical condition (e.g., gas pressure, temperature, etc.). TPM sensor 104 may include an antenna 110 that is configured to receive and present a number of signals wherein the signals may be broadcast at any appropriate frequency (e.g., low frequency, LF, radio frequency, RF, etc.) and via any appropriate protocol (e.g., on-off keying (OOK), amplitude shift keying (ASK), or frequency shift keying (FSK) modulation, etc.). Antenna 110 may be coupled to a sensor transceiver (not shown) while the sensor transceiver may be coupled to the at least one sensing device and be configured to receive and transmit the appropriate signals. As such, TPM sensor 104 may also have memory storage capabilities. Particularly, in one aspect, TPM sensor 104 may have flash memory which, as recognized by one of ordinary skill in the art, is a non-volatile type of memory.

In one aspect, TPM sensor 104 may also monitor its internal components and/or devices (e.g., a pressure device, a temperature device, etc.) and transmit corresponding signals to immobilizer 102. For example, if an internal component, such as a pressure or temperature device, experiences an anomalous event, TPM sensor 104 may generate a signal indicating the anomalous event that is received by immobilizer 102. As such, immobilizer 102 may activate a visual and/or audible indicator thereby notifying a vehicle occupant.

As stated in the foregoing, immobilizer 102 may generate a LF signal that causes a re-write, alteration or modification of the TPM sensor 104 ID. Re-writing the TPM sensor 104 ID may be required when, for example, TPM sensor 104 is damaged and replacement is recommended. Additionally, re-writing of the TPM sensor 104 ID may be required to properly program or re-program TPM sensor 104 for a particular vehicle or TPM system application.

In one embodiment, a bank of TPM sensor IDs is stored in the memory of TPM sensor 104, immobilizer 102 or any other module that interfaces with immobilizer 102. Accordingly, when immobilizer 102 transmits the LF signal, the LF signal contains data pertaining to an ID retrieved from the TPM sensor ID bank. In an alternative embodiment, where TPM sensor 104 is damaged or functioning incorrectly, immobilizer 102 may read the ID of the damaged TPM sensor and transmit an LF signal containing the ID of the damaged sensor to a replacement TPM sensor 104. The ID of the damaged TPM sensor may be read as a result of a signal that is transmitted from the damaged TPM sensor to immobilizer 102. In conventional TPM systems, re-writing the ID of TPM sensor 104 is accomplished by placing the entire TPM system in a "learn mode." In such a case, the operator and/or vehicle technician must take the vehicle through a sequence of events (e.g., place the ignition in the "ON" position, press the vehicle brake twice, and press a "reset" button located on the vehicle) to re-write the ID of TPM sensor 104. Accordingly, re-writing the ID of TPM sensor 104 via the LF signal simplifies the sensor ID write/re-write process.

The LF signal from immobilizer 102 may also write data to TPM sensor 104 that causes reconfiguration of TPM sensor 104. In one embodiment, reconfiguration of TPM sensor 104 includes updating memory registers of TPM sensor 104. Reconfiguration of TPM sensor 104 may be desired when the TPM system is upgraded or enhanced. Regarding conventional TPM systems having TPM sensors, reconfiguration of these TPM sensors typically require the physical removal and replacement of the TPM sensor. Accordingly, the embodiments described above streamline the reconfiguration process for TPM sensor 104.

As described above, TPM sensor 104 may have flash memory. As such, immobilizer 102, via the LF signals, may reconfigure the operating parameters of TPM sensor 104 by "re-flashing" or erasing the flash memory of TPM sensor 104. In such an instance, the operating parameters of TPM sensor 104 may be written/re-written for virtually any application. Conversely, conventional TPM systems having TPM sensors are incapable of on-vehicle re-flashing.

Furthermore, a target (i.e., a particular) one of the at least one TPM sensors 104 is generally positioned (i.e., placed, set, located, disposed, etc.) near the vehicle where the LF immobilizer 102 is implemented at or near the normal operation location. When the sensor 104 is to be tested for functionality, the sensor 104 may be placed at any appropriate location on, in or near the vehicle. However, the sensor 104 may be located at any appropriate location to meet the design criteria of a particular application.

When the particular (or target) TPM sensor 104 receives the signal (or command) TEST, the sensor 104 generally presents a message (or signal), (e.g., RECD). The sensor 104 is generally configured to present the signal RECD in response to the signal TEST. The message signal RECD is generally implemented as an RF signal in connection with an RKE system of the vehicle where the TPM system 100 is implemented.

The signal RECD generally comprises information (or data) that indicates that the signal TEST was properly received by the target TPM sensor 104 and that the TPM sensor 104 is operating properly. The signal RECD may further comprise information that provides an indication that the sensor 104 is operating properly, however, not at a location that can be particularly located, etc. The signal RECD may further comprise information regarding the unique identifier for the target sensor 104. The message signal RECD may further comprise information that provides the system 100 an indication of proper operation of one or more of the at least one sensing devices that comprise the TPM sensor 104.

In one example, the receiver 106 may be implemented as a TPM RF receiver. The receiver 106 is generally implemented as a combination RKE and TPM RF receiver. As such, the receiver 106 generally provides at least one RKE operation as well as at least one TPM operation. However, the receiver 106 may be implemented as any appropriate receiver to meet the design criteria of a particular application. The receiver 106 generally receives the signal RECD and provides the user (or operator) an indication of the information that may be contained in the signal RECD (i.e., the circuit 106 is generally configured to provide the user at least one indication of TPM sensor (e.g., sensor 104) operation in response to the signal RECD). For example, the receiver 106 generally provides an indication (e.g., a visual and/or audible signal) when the signal RECD is received, and an alert (e.g., a visual and/or audible signal) when the signal RECD is not received in response to transmission of the signal TEST.

Thus, the user is generally provided the information that the sensor 104 is operating properly (or not operating properly), and, for example, the TPM sensor 104 may be installed on a wheel prior to the installation of the wheel on the vehicle with reduced concern for wasted time. The receiver 106 may be further configured to provide the operator additional information that may be contained in the at least one signal RECD (e.g., location of the sensor 104, proper operation or failure of proper operation of the at least one sensing devices that comprise the sensor 104, etc.). The signal RECD may "teach" (i.e., relate, associate, etc.) the sensor 104 identifier to the system 100.

Figure 2:
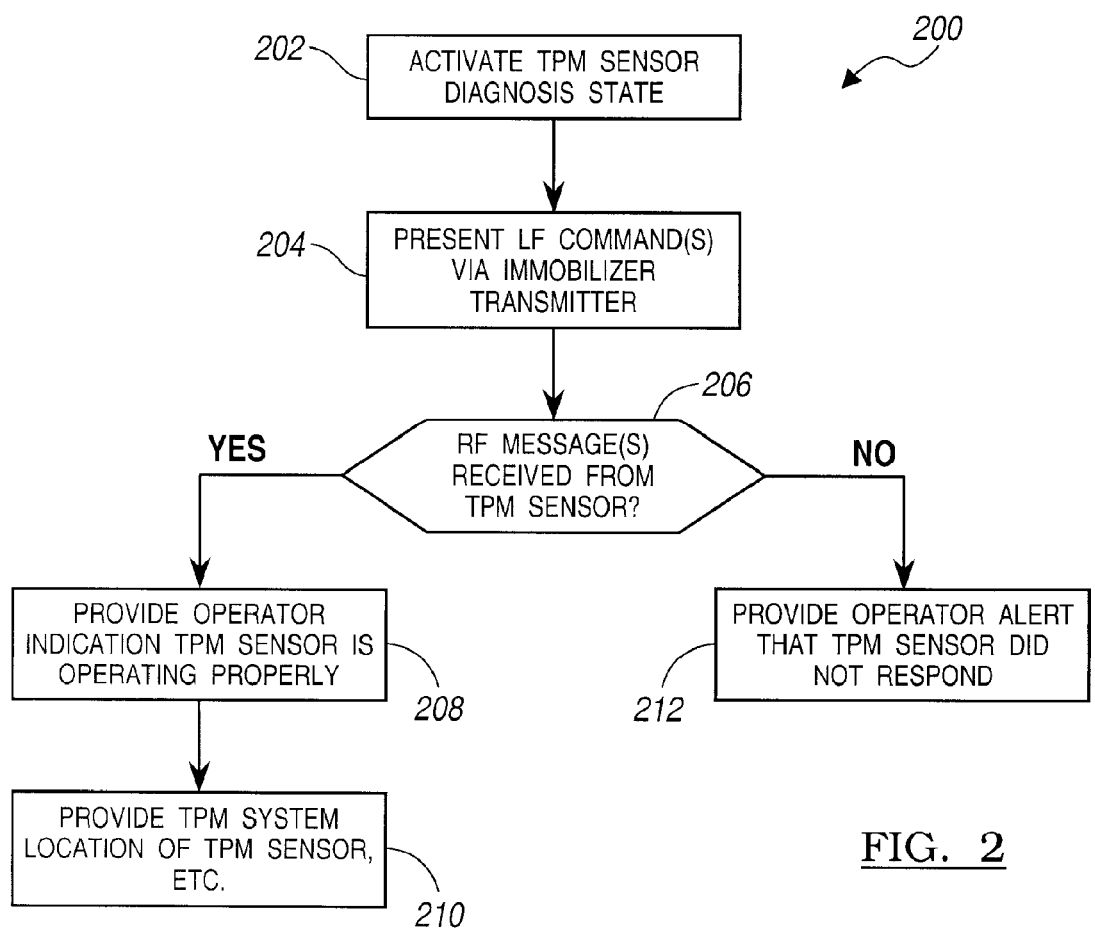
FIG. 2 is a flow diagram of an operation of the tire pressure monitoring system of FIG. 1.

Referring to FIG. 2, a flow diagram illustrating an operation (e.g., method, process, routine, commands, steps, blocks, etc.) 200 in accordance with the present invention is shown. The operation 200 is generally implemented as a method that may provide for command and control of a vehicle anti-theft immobilizer system to a TPM sensor when the TPM sensor is placed nearby the vehicle anti-theft immobilizer system, and for response via a vehicle TPM, RKE, or combination TPM/RKE system, such that sensor testing, diagnosis, teaching the TPM sensor to the vehicle, associating the sensor 104 identification code to the system 100, or a particular sensor location on the vehicle, and the like may be performed without implementation of specialized equipment as is implemented in conventional approaches. The method 200 may be implemented in connection with a TPM system such as the system 100. However, the method 200 may be implemented in connection with any appropriate TPM system to meet the design criteria of a particular application.

An operator (e.g., user, owner, technician, mechanic, etc.) may activate (i.e., initiate, start, begin, etc.) the process 200 (step or block 202). The process 200 may be initiated when the user desires to test the operation of a target (i.e., a particular) TPM sensor, associate a TPM sensor to a particular vehicle location, perform diagnosis on a TPM sensor, perform diagnosis on a TPM system (e.g., via implementation of a known good TPM sensor), associate a unique sensor 104 identifier to a vehicle TPM. RKE, or combination TPM/RKE system, etc., and the user does not have available the specialized equipment that is implemented in connection with conventional approaches to such processes. The step of activating the process 200 (i.e., step 202) generally includes positioning a TPM sensor (e.g., at least one TPM sensor 104, generally a target one of the TPM sensors 104), at a desired location such as at or near (i.e., nearby) a normal operating position on the vehicle where the process 200 is implemented. The operator generally initiates the process 200 independently of vehicle immobilization operation.

An LF command or TPM sensor/system diagnostic signal (e.g., the signal TEST) may be presented by an immobilizer transmitter (e.g., the immobilizer 102) (step or block 204). The process 200 may be implemented to determine whether the signal TEST was received by the target TPM sensor and the TPM sensor presented (i.e., transmitted, sent, broadcast, etc.) a message that indicates the TPM sensor is operating properly (e.g., the signal RECD) to a RKE/TPM receiver (e.g., the receiver 106) (decision step or block 206). Additionally, the LF command presented at block 204 may also write information to TPM sensor 104. As described above, in some aspects of the invention, the LF command may write/re-write the identification code for TPM sensor 104, reconfigure the operating parameters of TPM sensor 104, and re-flash the memory of TPM sensor 104.

When the signal RECD is received and the target TPM sensor is operating properly (i.e., the YES leg of decision block 206), the receiver (e.g., the receiver 106) generally provides the operator an indication that the TPM sensor is operating properly (e.g., the signal RECD is presented by the target one of the at least one TPM sensor 104) and an indication is presented to the operator (step or block 208). In one example, the receiver implemented in connection with the process 200 may further (i.e., optionally) provide the operator additional information (or data) such as an indication of the location of the TPM sensor (e.g., right front tire, left rear tire, spare tire, etc.), information that the TPM sensor is properly operational, however, not at a location that can be particularly located, an indication of proper operation one or more of the at least one sensing devices that comprise the TPM sensor, association (or "teaching") of a unique sensor 104 to the system 100, and the like (step or block 210).

Returning to the decision step 206, When the signal RECD is not received (i.e., the NO leg of the decision block 206), an alert is generally presented to the operator (e.g., via the receiver 106) (step or block 212). The alert generally provides an indication that the target TPM sensor did not respond (e.g., the signal RECD was not presented in response to transmission of the signal TEST) within a predetermined time interval. The operator may take steps for diagnosis, repair, replacement, etc. for the TPM sensor and/or other elements of the TPM system (e.g., the immobilizer 102, the receiver 106, etc.) without having expended significant time and cost associated with mounting the TPM sensor in a wheel assembly, and mounting the wheel assembly on the vehicle, and testing the TPM sensor operation as is performed in conventional approaches.

As is readily apparent from the foregoing description, the present invention generally provides an improved system (e.g., the system 100) and an improved method (e.g., the method 200) for tire pressure monitoring sensor diagnosis via vehicle anti-theft (e.g., immobilizer) systems and/or entry (e.g., TPM, RKE, or combination TPM/RKE) systems. Such a system and method may provide a new and innovative TPM sensor test and diagnosis, and result in the saving of a significant amount of time and cost when compared to conventional approaches to TPM sensor test and diagnosis.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle tire pressure monitoring (TPM) system, the system comprising:

an immobilizer transmitter that transmits at least one low frequency (LF) sensor diagnostic signal;

at least one TPM sensor having a memory, wherein the at least one TPM sensor comprises a transceiver that receives the at least one LF sensor diagnostic signal and, when the at least one TPM sensor is operating properly, presents at least one radio frequency (RF) message signal; and a TPM receiver that receives the at least one RF message signal and provides an indication to an operator when the at least one RF message signal is received, wherein the LF sensor diagnostic signal is adapted for transmission to determine proper operation of the at least one TPM sensor and re-configure the operating parameters of the at least one TPM sensor and the LF sensor diagnostic signal is adapted for transmission in connection with a TPM sensor association to include a TPM sensor identification that is selected from a bank of sensor identifications stored in the immobilizer.

2. The system of claim 1 wherein the TPM receiver provides an alert to the operator when the at least one RF message signal is not received in response to the LF sensor diagnostic signal.

3. The system of claim 1 wherein the operator initiates transmission of the LF sensor diagnostic signal independently of vehicle immobilization operation and the LF sensor diagnostic signal reconfigures the operating parameters of the at least one TPM sensor by re-flashing the memory of the TPM sensor.

4. The system of claim 3 wherein the immobilizer transmitter transmits at least one second LF signal that is related to at least one vehicle theft deterrent operation.

5. The system of claim 1 wherein the operating parameters of the TPM sensor are reconfigured by re-flashing the memory of the TPM sensor.

6. The system of claim 1 wherein the LF sensor diagnostic signal is transmitted in connection with at least one of a TPM sensor test, a TPM sensor diagnosis, a TPM system diagnosis, and a TPM sensor location association on a vehicle.

7. The system of claim 6 wherein the LF sensor diagnostic signal is transmitted in connection with a TPM sensor association to the TPM system includes the LF sensor diagnostic signal being transmitted having a TPM sensor identification that is selected from another TPM sensor.

8. The system of claim 1 wherein the immobilizer is configured to receive the TPM sensor identification of a damaged TPM sensor and to transmit the LF sensor diagnostic signal which includes the TPM sensor identification of the damaged TPM sensor to a replacement TPM sensor.

9. For use in a vehicle tire pressure monitoring (TPM) system, a method of determining proper operation of a TPM sensor, the method comprising:

transmitting at least one low frequency (LF) sensor diagnostic signal via an immobilizer transmitter;

providing at least one TPM sensor, wherein the at least one TPM sensor comprises a transceiver that receives the at least one LF command signal and presents at least one radio frequency (RF) message signal;

presenting the RF message signal when the at least one TPM sensor is operating properly; and providing an indication to an operator when the at least one RF message signal is received by a TPM receiver, wherein the LF sensor diagnostic signal is adapted for transmission to determine proper operation of the at least one TPM sensor and re-configure the operating parameters of the at least one TPM sensor and wherein the LF sensor diagnostic signal is adapted for transmission in connection with a TPM sensor association to include a TPM sensor identification that is selected from another TPM sensor.

10. The method of claim 9 further comprising providing an alert to the operator when the at least one RF message signal is not received by the TPM receiver in response to the LF sensor diagnostic signal.

11. The method of claim 9 wherein the operator initiates transmission of the LF sensor diagnostic signal independently of vehicle immobilization operation.

12. The method of claim 11 wherein the immobilizer transmitter transmits at least one second LF signal that is related to at least one vehicle theft deterrent operation.

13. The method of claim 9 wherein TPM sensor further comprises a memory, and the operating parameters of the TPM sensor are reconfigured by re-flashing the memory.

14. The method of claim 9 wherein the LF sensor diagnostic signal is presented in connection with at least one of a TPM sensor test, a TPM sensor diagnosis, a TPM system diagnosis, and a TPM sensor location association on a vehicle.

15. The method of claim 9 wherein the LF sensor diagnostic signal is further adapted to include a TPM sensor identification that is selected from a bank of sensor identifications stored in the immobilizer.

16. The method of claim 9 further comprising receiving the TPM sensor identification of a damaged TPM sensor and presenting the LF sensor diagnostic signal which includes the TPM sensor identification of the damaged TPM sensor to a replacement TPM sensor.

17. A vehicle tire pressure monitoring (TPM) system having self-diagnostics, the system comprising:

an immobilizer transmitter that transmits at least one low frequency (LF) sensor diagnostic signal;

at least one TPM sensor that comprises a transceiver that receives the at least one LF sensor diagnostic signal, and presents at least one radio frequency (RF) message signal in response to the LF sensor diagnostic signal when operating properly; and a combination remote keyless entry and TPM receiver that receives the at least one RF message signal and provides an indication to an operator when the at least one RF message signal is received and an alert to the operator when the at least one RF message signal is not received, wherein the LF sensor diagnostic signal is adapted for transmission to determine proper operation of the at least one TPM sensor and re-configure the operating parameters of the at least one TPM sensor, and wherein the LF sensor diagnostic signal is adapted for transmission in connection with a TPM sensor association to include a TPM sensor identification that is selected from another TPM sensor.

18. The system of claim 17 wherein the LF sensor diagnostic signal is transmitted in connection with at least one of a TPM sensor test, a TPM sensor diagnosis, a TPM system diagnosis, and a TPM sensor location association on a vehicle.

19. The system of claim 17 wherein the LF sensor diagnostic signal is adapted for transmission in connection with the TPM sensor association to include a TPM sensor identification that is selected from a bank of sensor identifications stored in the immobilizer.

20. The system of claim 19 wherein the TPM sensor further comprises a memory, and the operating parameters of the TPM sensor are reconfigured by re-flashing the memory of the TPM sensor.

* * * * *